(12) United States Patent
Jacquot et al.

(10) Patent No.: US 8,018,469 B2
(45) Date of Patent: Sep. 13, 2011

(54) SYSTEM, DEVICE, METHOD AND UTILITY TO CONVERT IMAGES RETRIEVED FROM A DEVICE TO A FORMAT SUPPORTED BY A DEVICE MANAGEMENT TOOL (75) Inventors: Bryan J. Jacquot, Windsor, CO (US); Andrew Christopher Walton, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1718 days.

(21) Appl. No.: 11/260,919

(22) Filed: Oct. 27, 2005

(65) Prior Publication Data
US 2007/0097396 A1 May 3, 2007

(51) Int. Cl.
*G09G 5/00* (2006.01)
(52) U.S. Cl. ........ 345/619; 345/581; 345/589; 345/660; 345/661; 715/736; 715/771; 715/772
(58) Field of Classification Search ........................ None
See application file for complete search history.

(56) References Cited

U.S. PATENT DOCUMENTS

| | | | | |
|---|---|---|---|---|
| 4,737,858 A * | 4/1988 | DeBaryshe | | 358/296 |
| 5,650,941 A * | 7/1997 | Coelho et al. | | 345/619 |
| 6,307,559 B1 * | 10/2001 | Hancock et al. | | 345/619 |
| 6,771,288 B2 * | 8/2004 | Boulter | | 715/736 |
| 7,324,119 B1 * | 1/2008 | Puri et al. | | 345/602 |
| 2002/0085088 A1 * | 7/2002 | Eubanks | | 348/22 |
| 2003/0090459 A1 | 5/2003 | Lapstun et al. | | |
| 2003/0098862 A1 * | 5/2003 | Hunt et al. | | 345/418 |
| 2003/0154266 A1 | 8/2003 | Bobick et al. | | |
| 2004/0030778 A1 | 2/2004 | Kronenberg et al. | | |
| 2004/0083138 A1 | 4/2004 | Silverbrook et al. | | |
| 2004/0093559 A1 | 5/2004 | Amaru et al. | | |
| 2004/0104928 A1 | 6/2004 | Morioka | | |
| 2005/0041019 A1 * | 2/2005 | King et al. | | 345/184 |

FOREIGN PATENT DOCUMENTS
JP 2001356890 A 12/2001
JP 2004164208 A 6/2004

* cited by examiner

*Primary Examiner* — Kee M Tung
*Assistant Examiner* — Jwalant Amin (57) ABSTRACT

In one embodiment, an image conversion utility is embodied in code that, in response to receiving an image request from a device management tool: 1) retrieve an image from a device that is a target of the image request, the image illustrating at least a portion of the device; 2) convert the image to a format supported by the device management tool; and 3) return the converted image to the device management tool. Other embodiments are also disclosed.

22 Claims, 4 Drawing Sheets

SYSTEM, DEVICE, METHOD AND UTILITY TO CONVERT IMAGES RETRIEVED FROM A DEVICE TO A FORMAT SUPPORTED BY A DEVICE MANAGEMENT TOOL

BACKGROUND

The management of a device is typically aided by providing its user with a means to graphically visualize the device. In some cases, one or more images of a device and its components may be included within paper or electronic documentation (e.g., a user manual). In other cases, a device may be provided with stickers showing one or more views of the device's interior components.

In still other cases, images of a device may be incorporated into a management tool for the device. For example, a print driver may display an image of the printer to which it corresponds, or a server management tool may display various images associated with the server components of which the management tool is aware or can manage (e.g., the server's memory modules, interfaces, or storage disks).

Many devices for which graphical images are needed are subject to change. That is, the devices may be upgradeable such that additional components (e.g., memory modules, interfaces, or storage disks) may be inserted into or attached to the device. Thus, an issue facing the image creator is whether to draw an image of each configuration of the device or draw a single "exemplar" image in which the device is depicted in one particular "default" configuration.

A device may also be subject to change over its lifecycle. That is, the styling of the device's exterior, the suppliers of its internal components, its "default" configuration, and even its available features can change over its lifecycle. Thus, any images pertaining to the first generation of the device may not accurately depict later generations of the device.

As one can appreciate, the creation and maintenance of graphical images for a device can present a significant burden for both device manufacturers and third-party device supporters (e.g., management tool developers).

SUMMARY OF THE INVENTION

In one embodiment, an image conversion utility comprises code to, in response to receiving an image request from a device management tool: 1) retrieve an image from a device that is a target of the image request, the image illustrating at least a portion of the device; 2) convert the image to a format supported by the device management tool; and 3) return the converted image to the device management tool.

In another embodiment, an article of manufacture comprises computer-readable media, and computer-readable code that is stored on the computer-readable media. The computer-readable code includes code to, in response to receiving an image request from a device management tool, 1) retrieve an image from a device that is a target of the image request, the image illustrating at least a portion of the device; 2) convert the image to a format supported by the device management tool; and 3) return the converted image to the device management tool.

In yet another embodiment, a device comprises a non-volatile memory in which an image illustrating at least a portion of the device is stored, and an interface to receive image requests. The image comprises a plurality of vectors. The device also comprises code to, in response to receiving an image request from a device management tool: 1) retrieve the image; 2) convert the image to a format supported by the device management tool; and 3) return the converted image to the device management tool.

In still another embodiment, a computer-implemented method for converting images of a device comprises, in response to receiving an image request from a device management tool: 1) retrieving an image from a device that is a target of the image request, the image illustrating at least a portion of the device; 2) converting the image to a format supported by the device management tool; and 3) returning the converted image to the device management tool.

In an additional embodiment, a system for displaying images of a device comprises a device having a non-volatile memory in which an image illustrating the device is stored. The system also comprises a device management tool and an image conversion utility. The image conversion utility comprises code to, in response to receiving an image request from the device management tool: 1) retrieve the image from the device; 2) convert the image to a format supported by the device management tool; and 3) return the converted image to the device management tool.

Other embodiments are also disclosed.

BRIEF DESCRIPTION OF THE DRAWINGS

Illustrative embodiments of the invention are illustrated in the drawings, in which.

DETAILED DESCRIPTION

One development that has eased the burden of creating and maintaining graphical images for a device is the electronic storage of a device's images within the device itself. For example, different images pertaining to different views and/or components of a device may be saved as Scalable Vector Graphics (SVG) images, or other easy-to-manipulate image types, and stored within a non-volatile memory of the device (preferably, but not always, in the device's firmware). Thus, a management tool for the device no longer needs to provide its own set of images for the device. Rather, the management tool need only be provided with abilities to 1) query the device to retrieve an image of the device, and 2) format the image to reflect the current state of the device. In this manner, the developer of the management tool need not be concerned with how the device looks, and can instead focus on how the device functions and is managed.

To further ease a management tool developer's burden of having to work with device images, an image conversion utility, and device and system incorporating same, are disclosed herein. By way of example, the "utility" may take the form of an application or browser plug-in that is embodied in computer-readable code stored on one or more computer-readable media. The computer-readable media may include, for example, any number or mixture of fixed or removable media (such as one or more fixed disks, random access memories (RAMs), read-only memories (ROMs), or compact discs), at either a single location or distributed over a network. In some cases, the utility may be stored and executed apart from any management tool that it receives images from, and apart from any device from which it retrieves images. In other cases, the utility may be stored and executed locally to a particular management tool or device.

Figure 1:
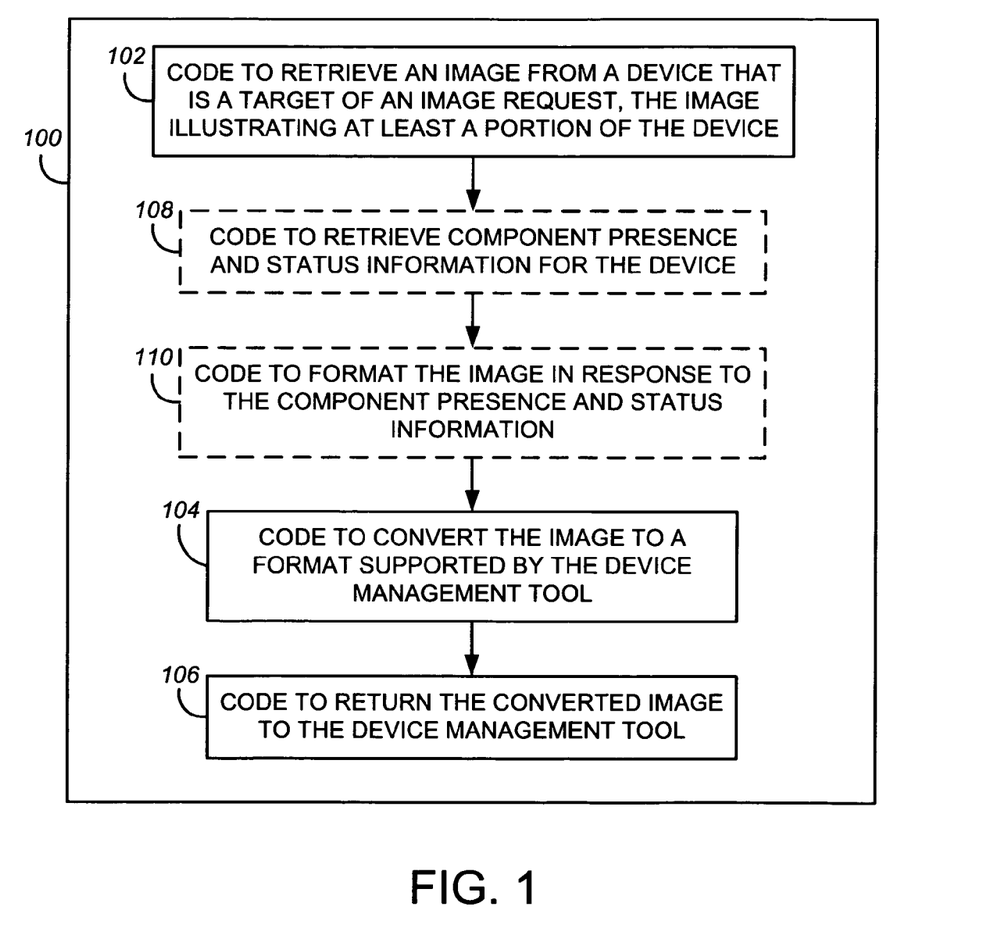
FIG. 1 illustrates a first exemplary embodiment of an image conversion utility.

FIG. 1 illustrates a first exemplary embodiment of an image conversion utility 100. The utility 100 comprises code 102, 104, 106 to, in response to receiving an image request from a device management tool: 1) retrieve an image from a device that is a target of the image request; 2) convert the image to a format supported by the device management tool; and 3) return the converted image to the device management tool.

Optionally, but preferably, the utility 100 comprises code 108, 110 to retrieve component presence and status information for the device, and code to, prior to converting the image, format the image in response to the component presence and status information. As explained in detail later in this Description, "formatting" a selected image may comprise updating the image's native format to reflect component presence and status information, as well as other information. In addition, if an image exists in an un-rendered format, such as a Scalable Vector Graphics (SVG) format, "formatting" may comprise rendering the image (i.e., converting the image to a raster-based format).

Figure 2:
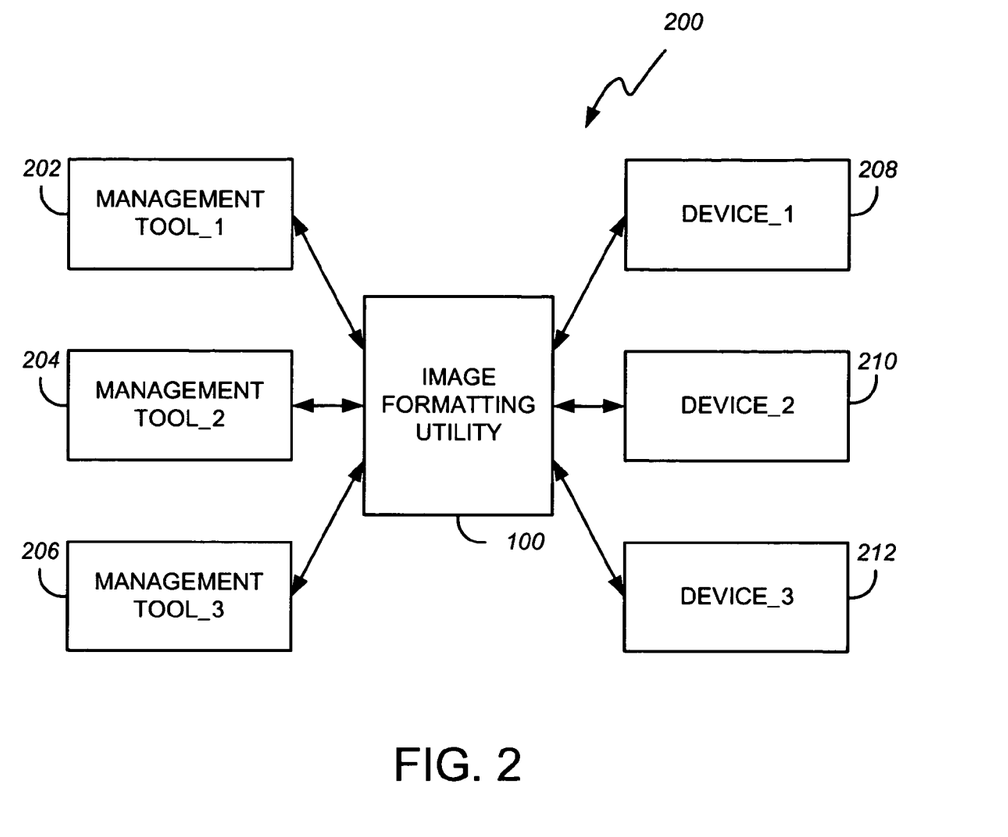
FIG. 2 illustrates an exemplary system in which the image conversion utility shown in FIG. 1 may be used.

FIG. 2 illustrates an exemplary system 200 in which the image conversion utility 100 may be used. The system 200 comprises one or more device management tools 202, 204, 206 for generating image requests, and one or more devices 208, 210, 212 that may be targets of the image requests. Each of the devices 208-212 is provided with a non-volatile memory in which one or more images (i.e., an image set) illustrating at least a portion of the device is stored. Assuming that the management tools 202-206 and devices 208-212 comprise interfaces that are compatible with those of the image conversion utility 100, the utility 100 may 1) receive plural image requests from any one or more of the management tools 202-206, and 2) in responding to the plural image requests, convert images retrieved from a plurality of the devices 208-212 and return the converted images to the requesting ones of the management tools 202-206 (possibly in a plurality of image formats). Of note, the management tools 202-206 and devices 208-212 of the system 200 have no direct link to, nor dependence on, each other. Thus, one or the other can easily be modified or appended to without affecting the other. Furthermore, the image(s) stored within the devices 208-212 can be updated without any need to worry about how the updated images will be drawn by the utility 100 or the management tools 202-206.

The devices 208-212 of the system 200 may take various forms, including, for example, those of a: server, computer system, printer, or network. Further, the devices in which images are stored may be parts of other devices. For example, images may be stored in a memory of a computer motherboard, while additional images may be stored in a configurable video or networking card that has been inserted into a slot of the motherboard.

The management tools 202-206 of the system 200 may also take various forms, including, for example, those of a: print driver, configuration manager, licensing manager, server manager, system manager, or network manager. In one embodiment of the system 200, one or more of the device management tools 202-206 may present a user interface (e.g., a graphical user interface (GUI)) through a web browser.

In alternatives to the system 200 shown in FIG. 2, one or more image conversion utilities may be incorporated into some or all of the management tools 202-206 or devices 208-212. If an image conversion utility is incorporated into a device, the device must be provided with an interface for receiving image requests. However, in both of the alternatives mentioned in this paragraph, the image conversion utilities are less versatile than the utility 100 shown in FIG. 2.

Figure 3:
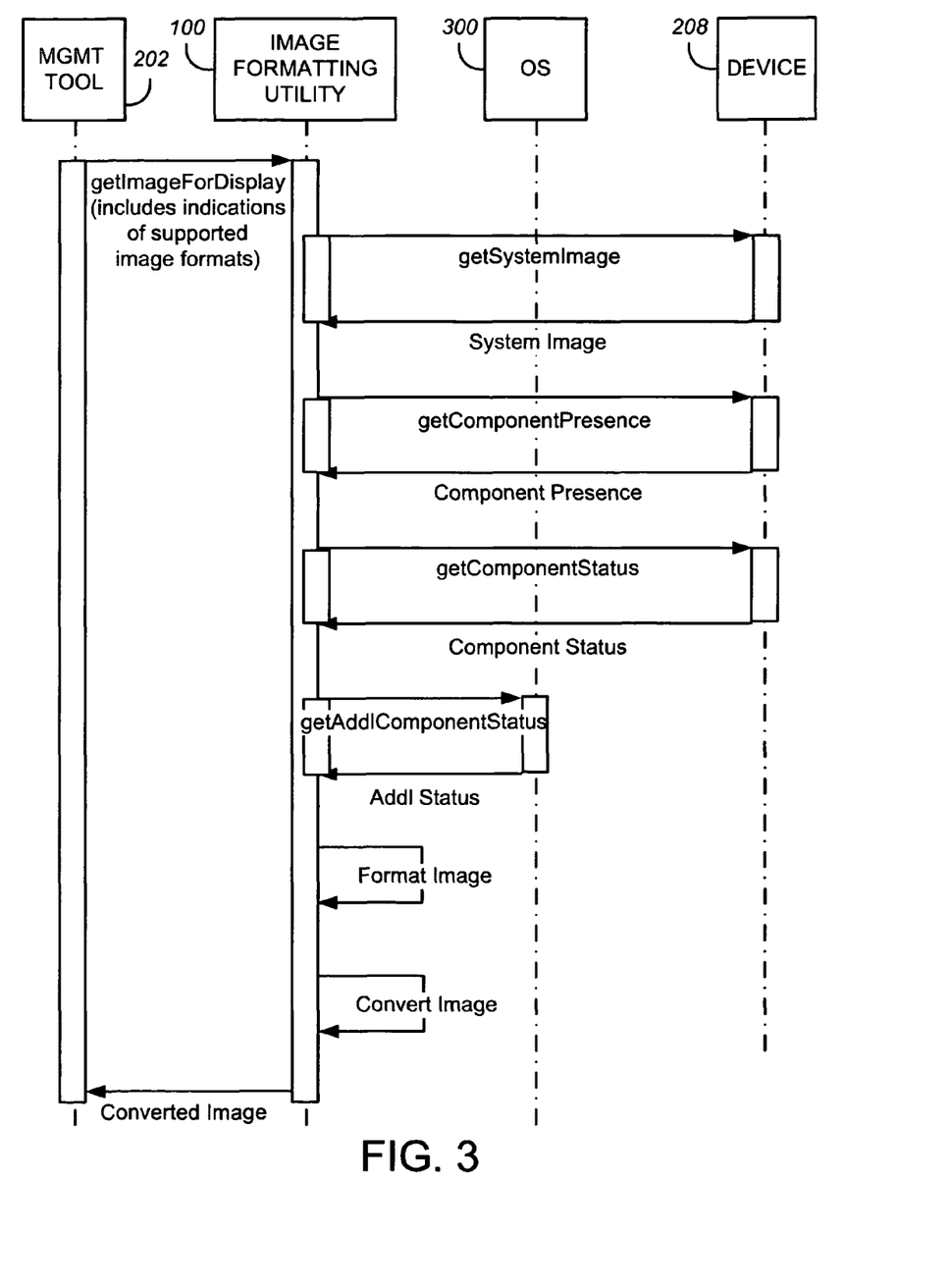
FIGS. 3 & 4 illustrate exemplary operations of the image conversion utility shown in FIGS. 1 & 2.

FIG. 3 illustrates a first exemplary operation of the image conversion utility 100 shown in FIGS. 1 & 2. Upon receiving an image request (e.g., getImageForDisplay) from a device management tool 202, the utility 100 may issue a command (e.g., getSystemimage) for the purpose of retrieving an image from the device 208 that is the target of the image request. However, in some cases, the utility 100 may cache retrieved images and may first search its cache for a desired image. As indicated, the image request (getImageForDisplay) is received by the utility 100 along with one or more indications of image formats supported by the device management tool 202.

In a simple embodiment, the interface of the device 208 need only have an ability to fetch and return its stored image set (possibly only one image). However, in other embodiments, the device's interface may have an ability to fetch a particular image (e.g., via address, number or type). The device's interface may also return component presence and status information for the device 208, although it need not.

Preferably, a device's image set comprises one or more SVG images. SVG is a language for describing two-dimensional graphics and graphical applications in eXtensible markup language (XML). SVG specifications are published by the World Wide Web Consortium (W3C®). SVG images can be advantageous as a result of their small storage requirements, scalable size, and configurability. Alternately, a device's image set may comprise other types of easy-to-manipulate images, such as other vector-based images (e.g., postscript images).

Upon receiving an image set from the device 208, the utility 100 may issue one or more commands (e.g., getComponentPresence and getComponentStatus) to retrieve component presence and status information from the device 208 (e.g., from firmware of the device). The presence information indicates whether upgradeable or configurable components are present in or on the device. The status information may be as simple as positive/negative indications of whether components are functioning as desired, or may comprise additional information regarding the quality or consistency of a component's performance.

In some cases, the utility 100 may retrieve additional status information for the device 208 from an operating system 300 that interfaces with the device 208 (e.g., via the command getAddlComponentStatus). Additional status information may also be retrieved from one or more management tools 204, 206 of which the utility 100 is aware. However, in one embodiment, the utility 100 is designed such that it can function without any specific knowledge of the management tools 202-206 and devices 208-212 with which it interfaces.

Upon (and sometimes before) receiving presence and status information for a device 208, the utility 100 proceeds to format a selected image or images of the image set (Format Image, FIG. 3) in response to 1) a received image request, and 2) component presence and status information that the utility 100 acquires while processing the image request.

In one embodiment, the utility 100 uses component presence information to enable or disable parts of an image that define particular components of a device, thereby dictating which parts of the image will be displayed. For example, if the image is an SVG image, the image may comprise sets of vectors that define a base device as well as the placement, size and orientation of components that can be installed on the base device (e.g., an image may define a motherboard, as well as processors and memory cards that may be installed on the motherboard). Each of the component vector sets in the SVG image may be associated with an identifying "tag". In this manner, an SVG image may be formatted in response to component presence information by 1) searching for tags corresponding to various components, and 2) editing the tags to indicate whether their associated vector sets should be made "visible" (enabled) or "invisible" (disabled). Alternately, vector sets corresponding to absent components can be deleted, and all other vector sets can be made visible. Or, if image formatting is to include image rendering (i.e., conversion of the image to a raster-based format), component presence information may be used to simply determine what portions of an image will be rendered, without causing the native image file to be edited.

An image may also be formatted by using component status information. In some cases, component status information may be used to annotate handles or fields associated with configurable areas of an image (i.e., areas of an image that are provided for display of particular pieces of information). Thus, for example, information concerning the operation or failure of the device 208 or its components, as well as additional information regarding the quality or consistency of a component's performance, may be added to (e.g., placed or filled in on) an image. In some cases, handles indicating what or where part or all of an image is may be translated to user-identifiable labels.

Status information may also be used to highlight a specified portion (or portions) of an image. For example, components that are operating as intended may be highlighted green, while failed components may be highlighted red. Alternately (or additionally), image highlighting may be performed in response to an image request. For example, if the image request asks to see a device's memory configuration, the installed memory modules on a device's motherboard may be highlighted.

If the image retrieved from a device is an SVG or other easy-to-manipulate image, the above-described presence and status formatting may be undertaken by making simple changes to the image file. For example, the style of a particular component, or the fill (e.g., text fill) of a particular field, can be changed by simply changing the text of one or more lines of an SVG image file.

If more than one image is available for retrieval from a device 208, the utility 100 may need to identify a particular image to format. Image identification/selection may be undertaken in a number of ways. For example, the utility 100 may scan the images for any indication of a default image, and then select the default image for formatting and conversion. In some cases, a device's images may be numbered or addressed such that an image corresponding to a particular number or address may be considered the device's default image. A device's images may also be linked in a tiered or tree form, such that one of its images may be clearly recognized by the utility 100 as a default image. The linking of images can also aid a management tool in being able to "drill down" through a set of images.

In lieu of selecting a default image, the utility 100 may be provided with code for identifying an image in response to parameters included in a received image request. For example, a management tool 202 may request an image that 1) depicts a best available view of a device 208, 2) depicts a best available view of a particular component or feature of the device 208 specified in an image request, or 3) depicts a best available view of a specified location of the device 208 (e.g., its exterior, interior, memory bank, or processor core) specified in an image request. The utility 100 may then filter the images based on various handles that it can locate for the images, such as indications of "what" or "where" the image is in the context of the device 208.

After formatting a retrieved image using presence and status information, the formatted image is converted to a format supported by the device management tool 202 (Convert Image, FIG. 3). Or, when no formatting is to be undertaken, the retrieved image (System Image) may simply be converted. In either case, image conversion is undertaken in response to the indication(s) of supported image formats that are received by the utility 100. When only one indication of a supported format is received, and the indication corresponds to an image format supported by the utility 100, the utility 100 may simply convert a formatted or native device image to the indicated format. When multiple indications of supported formats are received by the utility 100, the utility 100 may convert a formatted or native device image to an image format selected from a union of 1) the indications of image formats supported by the device management tool 202, and 2) image formats supported by the utility 100. In one embodiment, the image formats supported by the utility 100 are ranked in a preference order so that a more preferred format may be chosen in the case of a device management tool 202 indicating that it supports multiple image formats.

In one embodiment, the utility 100 performs image conversion using the Batik toolkit developed by the Apache foundation.

When the image retrieved from the device 208 is a vector image (e.g., an SVG image), image conversion will typically involve rendering the image as a raster image. In this case, portions of the rendered image may be correlated with the components of a device they represent (e.g., by correlating associations between i) portions of a rendered image, ii) the sets of vectors in a retrieved image file that are used to draw the portions of the rendered image, and iii) tags within the retrieved image file that identify the components that are associated with the sets of vectors). This correlation process may be facilitated by providing the utility 100 with code to generate a non-graphical overlay for the raster image, with the non-graphical overlay being based on information stored with the retrieved vector image. In one embodiment, the non-graphical overlay defines a location of one or more "hotspots" (i.e., areas of a raster image which may be selected by a user). In some cases, a hotspot may be associated with a call to the utility 100 (e.g., in the case of a hotspot to drill-down to another image of the device). In other cases, a hotspot may be associated with a call to the device management tool 202 (e.g., in the case of a hotspot that triggers an information query or other action from the device management tool 202).

One advantage of storing vector images in a device 208, and then using the utility 100 to convert the vector images to raster images, is that the utility 100 may be provided with code for scaling the images prior to their conversion to a raster format. In this manner, a device management tool that is only capable of displaying raster images can offer the appearance of being able to scale (e.g., zoom in or out on) its displayed images. In some cases, a device management tool 202 may provide a scale factor or related information along with an image request. In other cases, a device management tool 202 may first provide an image request to the utility 100, and then in response to user interaction with the image or its GUI, the tool 202 may provide the utility 100 with a request to scale the image. In this latter case, the utility 100 may scale the vector image it retrieved from the device 208, again convert the scaled vector image to a raster image, and then return a second raster image to the device management tool 202.

After converting an image, the utility 100 returns the converted image to the device management tool 202 that requested the image. See FIG. 3. In some cases, the utility 100 may return only a single converted image. In other cases, the utility 100 may return not only a converted image, but also such items as a non-graphical overlay, handle coordinates, an SVG coordinate-to-handle map, or an image-to-physical coordinate map.

Figure 4:
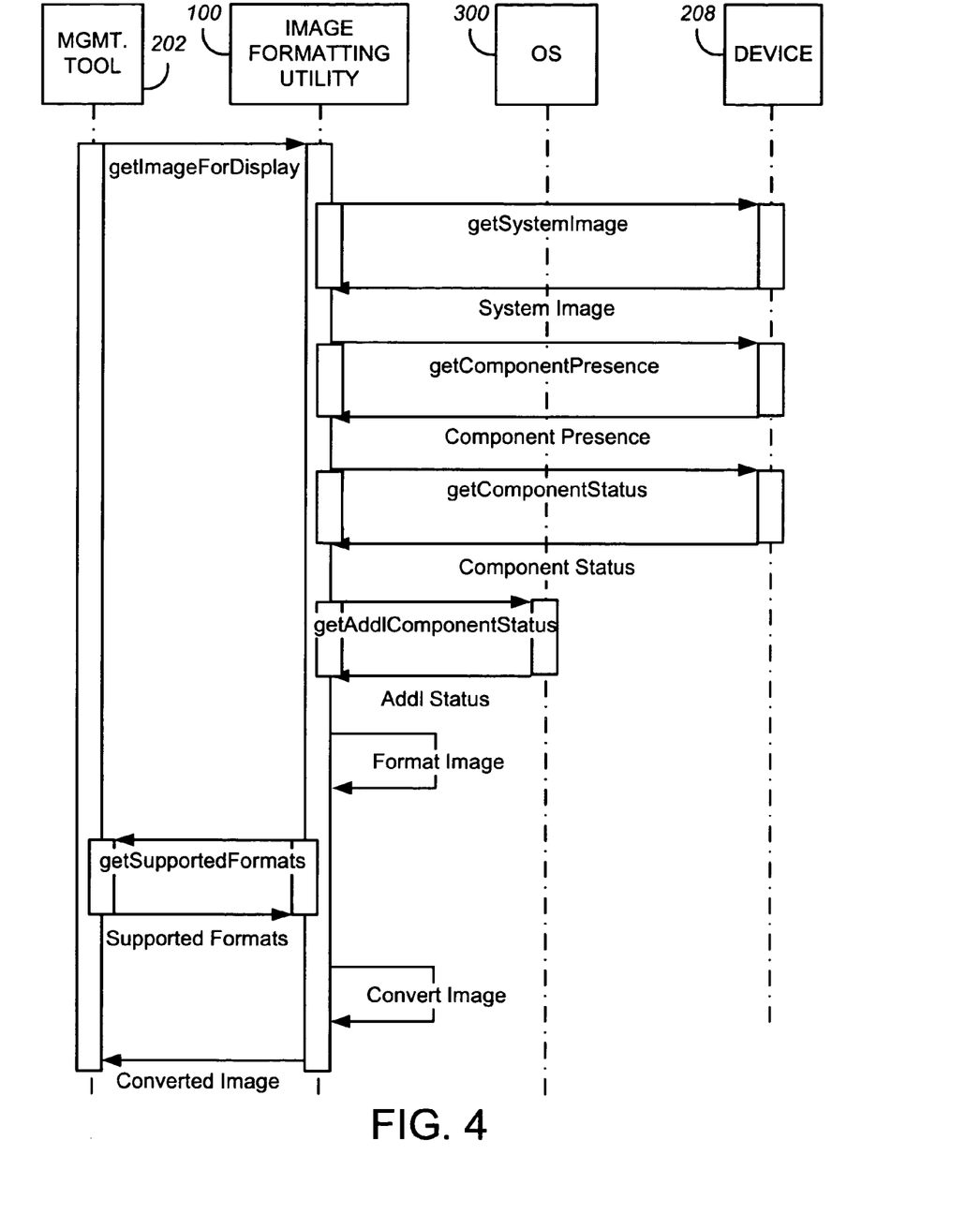

FIG. 4 illustrates a second exemplary operation of the image conversion utility 100 shown in FIGS. 1 & 2. The operation is similar to that depicted in FIG. 3, but for the manner in which the utility 100 obtains the indications of image formats supported by the device management tool 202. That is, instead of receiving the indications along with an image request, is disclosed in FIG. 3, the utility whose operation is shown in FIG. 4 comprises code to query the device management tool 202 (getSupportedFormats) for a supported image format or formats (Supported Formats). The utility then converts a retrieved image similarly to how a retrieved image is converted by the utility whose operation is shown in FIG. 3. It is noted that the query to the device management tool 202 may be made any time between the receipt of an image request (getImageForDisplay) and the conversion of a retrieved image (System Image).

What is claimed is:

1. A non-transitory computer-readable storage medium having computer-readable program code embodied therein for causing a computer system to perform an image conversion utility, said program code comprising:
    code to, in response to receiving an image request from a device management tool:
        retrieve an image from a device that is a target of the image request, the image illustrating at least a portion of the device;
        retrieve component presence and status information for the device, wherein the presence information indicates whether upgradeable and configurable components are present in or on the device; and wherein the status information indicates positively or negatively at least one of the following: whether components are functioning as desired, quality of a component's performance, and consistency of the component's performance;
        prior to converting the image, format the image to reflect the component presence and status information, wherein the image is formatted to reflect the component presence information by at least determining which parts of the image will be displayed based on at least one of the presence of the component, the ability of the component to be upgraded and the configurability of the component, wherein the determining comprises enabling a part of the image by making visible a particular component within the image and disabling a part of the image by making invisible a particular component within the image;
        convert the image to a format supported by the device management tool; and
        return the converted image to the device management tool.

2. The non-transitory computer-readable storage medium of claim 1, further comprising code to query the device management tool for a supported image format; wherein the code converts the image in response to the supported image format.

3. The non-transitory computer-readable storage medium of claim 1, further comprising code to query the device management tool for supported image formats; wherein the code converts the image in response to an image format selected from a union of i) supported image formats returned by the device management tool, and ii) image formats supported by the image conversion utility.

4. The non-transitory computer-readable storage medium of claim 1, wherein the image request is received along with an indication of an image format supported by the device management tool; and wherein the code converts the image in response to the received indication.

5. The non-transitory computer-readable storage medium of claim 1, wherein the image request is received along with indications of image formats supported by the device management tool; and wherein the code converts the image in response to an image format selected from a union of i) the indications of image formats supported by the device management tool, and ii) image formats supported by the image conversion utility.

6. The non-transitory computer-readable storage medium of claim 1, wherein the code to retrieve an image from the device is configured to retrieve a vector image; and wherein the code to convert the image comprises code to convert the vector image into a raster image.

7. The non-transitory computer-readable storage medium of claim 6, further comprising code to generate a non-graphical overlay for the raster image, the non-graphical overlay being based on information stored with the retrieved vector image.

8. The non-transitory computer-readable storage medium of claim 7, wherein the non-graphical overlay defines a location of at least one hotspot.

9. The non-transitory computer-readable storage medium of claim 8, wherein a first hotspot defined by the non-graphical overlay is associated with a call to the image conversion utility.

10. The non-transitory computer-readable storage medium of claim 8, wherein a first hotspot defined by the non-graphical overlay is associated with a call to the device management tool.

11. The non-transitory computer-readable storage medium of claim 6, further comprising code to scale the vector image prior to conversion of the vector image into a raster image.

12. The non-transitory computer-readable storage medium of claim 6, further comprising:
    code to, in response to receiving a request to scale the converted image,
        scale the vector image;
        convert the scaled vector image to a second raster image; and
        return the second raster image to the device management tool.

13. The non-transitory computer-readable storage medium of claim 1, wherein the image is a Scalable Vector Graphics (SVG) image.

14. The non-transitory computer-readable storage medium of claim 1, further comprising code to identify the retrieved image within an image set stored in the device.

15. The non-transitory computer-readable storage medium of claim 1, wherein the code is responsive to plural image requests received from a plurality of device management tools and, in responding to the plural image requests, the code converts images retrieved from a plurality of target devices into a plurality of formats and returns the converted images to requesting ones of the device management tools.

16. The non-transitory computer-readable storage medium of claim 1, wherein the utility is stored within and executed by the device.

17. An article of manufacture, comprising:
computer-readable media, excluding transitory propagating signals; and
computer-readable code, stored on the computer-readable media, including code to, in response to receiving an image request from a device management tool,
retrieve an image from a device that is a target of the image request, the image illustrating at least a portion of the device;
retrieve component presence and status information for the device, wherein the presence information indicates whether upgradeable and configurable components are present in or on the device; and wherein the status information indicates positively or negatively at least one of the following: whether components are functioning as desired, quality of a component's performance, and consistency of the component's performance;
prior to converting the image, format the image to reflect the component presence and status information, wherein the image is formatted to reflect the component presence information by at least determining which parts of the image will be displayed based on at least one of the presence of the component, the ability of the component to be upgraded and the configurability of the component, wherein the determining comprises enabling a part of the image by making visible a particular component within the image and disabling a part of the image by making invisible a particular component within the image;
convert the image to a format supported by the device management tool; and
return the converted image to the device management tool.

18. A device, comprising:
a non-volatile memory in which an image illustrating at least a portion of the device is stored, the image comprising a plurality of vectors;
an interface to receive image requests; and
code to, in response to receiving an image request from a device management tool,
retrieve the image;
retrieve component presence and status information for the device, wherein the presence information indicates whether upgradeable and configurable components are present in or on the device; and wherein the status information indicates positively or negatively at least one of the following: whether components are functioning as desired, quality of a component's performance, and consistency of the component's performance;
prior to converting the image, format the image to reflect the component presence and status information, wherein the image is formatted to reflect the component presence information by at least determining which parts of the image will be displayed based on at least one of the presence of the component, the ability of the component to be upgraded and the configurability of the component, wherein the determining comprises enabling a part of the image by making visible a particular component within the image and disabling a part of the image by making invisible a particular component within the image;
convert the image to a format supported by the device management tool; and
return the converted image to the device management tool.

19. A computer-implemented method for converting images of a device, comprising:
in response to receiving an image request from a device management tool,
retrieving an image from a device that is a target of the image request, the image illustrating at least a portion of the device;
retrieve component presence and status information for the device, wherein the presence information indicates whether upgradeable and configurable components are present in or on the device; and wherein the status information indicates positively or negatively at least one of the following: whether components are functioning as desired, quality of a component's performance, and consistency of the component's performance;
prior to converting the image, format the image to reflect the component presence and status information, wherein the image is formatted to reflect the component presence information by at least determining which parts of the image will be displayed based on at least one of the presence of the component, the ability of the component to be upgraded and the configurability of the component, wherein the determining comprises enabling a part of the image by making visible a particular component within the image and disabling a part of the image by making invisible a particular component within the image;
converting the image to a format supported by the device management tool; and
returning the converted image to the device management tool.

20. A system for displaying images of a device, comprising:
a device having a non-volatile memory in which an image illustrating the device is stored;
a device management tool; and
an image conversion utility comprising code to, in response to receiving an image request from the device management tool,
retrieve the image from the device;
retrieve component presence and status information for the device, wherein the presence information indicates whether upgradeable and configurable components are present in or on the device; and wherein the status information indicates positively or negatively at least one of the following: whether components are functioning as desired, quality of a component's performance, and consistency of the component's performance;
prior to converting the image, format the image to reflect the component presence and status information, wherein the image is formatted to reflect the component presence information by at least determining which parts of the image will be displayed based on at least one of the presence of the component, the ability of the component to be upgraded and the configurability of the component, wherein the determining comprises enabling a part of the image by making visible a particular component within the image and disabling a part of the image by making invisible a particular component within the image;
convert the image to a format supported by the device management tool; and
return the converted image to the device management tool.

21. The system of claim 20, wherein the image conversion utility further comprises code to query the device management tool for a supported image format; and wherein the code converts the image in response to the supported image format.

22. The system of claim 20, wherein the image request is received by the image conversion utility along with an indication of an image format supported by the device management tool; and wherein the code converts the image in response to the received indication.

* * * * *